United States Patent [19]
Takeda et al.

[11] Patent Number: 5,830,955
[45] Date of Patent: Nov. 3, 1998

[54] METHOD AND APPARATUS FOR STARTUP CONTROL OF POLYOLEFINE POLYMERIZATION REACTOR

[75] Inventors: Makoto Takeda; Hidetoshi Goto; Hidekazu Kudo, all of Oita, Japan

[73] Assignee: Showa Denko K.K., Tokyo, Japan

[21] Appl. No.: 768,101

[22] Filed: Dec. 16, 1996

Related U.S. Application Data

[63] Continuation of Ser. No. 356,521, Dec. 15, 1994, abandoned.

[30] Foreign Application Priority Data

Dec. 15, 1993 [JP] Japan .................................. 5-315644

[51] Int. Cl.$^6$ .................................................. C08F 2/00
[52] U.S. Cl. .............................. 526/60; 526/59; 526/61
[58] Field of Search ........................... 526/59, 60, 61

[56] References Cited

U.S. PATENT DOCUMENTS

| | | | |
|---|---|---|---|
| 3,551,403 | 12/1970 | Delbouille et al. | 526/59 |
| 3,998,995 | 12/1976 | Buss et al. | 526/59 |
| 5,151,474 | 9/1992 | Lange et al. | 526/59 |
| 5,504,166 | 4/1996 | Buchelli et al. | 526/60 |
| 5,627,242 | 5/1997 | Jacobsen et al. | 526/60 |

FOREIGN PATENT DOCUMENTS

| | | |
|---|---|---|
| A0111341 | 6/1984 | European Pat. Off. |
| A0230121 | 7/1987 | European Pat. Off. |
| A0486262 | 5/1992 | European Pat. Off. |

*Primary Examiner*—David W. Wu
*Attorney, Agent, or Firm*—Sughrue, Mion, Zinn, Macpeak & Seas, PLLC

[57] ABSTRACT

The method and apparatus for startup control of a polyolefine polymerization reactor of the present invention determines an olefine feed rate based on a reaction amount set by the heat balance within the polyolefine polymerization reactor, a reaction balance amount calculated from its unreacted amount and dynamic compensation amount, and the olefine concentration within the polyolefine polymerization reactor. Due to this, model errors are reduced, and the practical application of feed-forward control is possible.

10 Claims, 5 Drawing Sheets

FIG.2

| OLEFINE CONCENTRATION DEVIATION \ REACTION BALANCE AMOUNT | LOW | ZERO | HIGH | VERY HIGH |
|---|---|---|---|---|
| VERY HIGH | | | | LOWER A LITTLE |
| FAIRLY HIGH | | KEEP THE SAME | | |
| ZERO | RAISE A LITTLE | (1) RAISE A LITTLE (2) KEEP THE SAME | | |
| FAIRLY LOW | RAISE A LOT | RAISE A LITTLE | (1) KEEP THE SAME (2) RAISE A LITTLE | |
| LOW | EXTREMELY RAISE | RAISE A LOT | RAISE A LITTLE | |

FIG.3

| CHANGE IN RX TEMPERATURE MV VALUE \ REACTION BALANCE AMOUNT | NOT HIGH | VERY HIGH |
|---|---|---|
| ZERO | | KEEP THE SAME |
| FAIRLY LOW | RAISE A LITTLE | |
| LOW | RAISE A LOT | |

METHOD AND APPARATUS FOR STARTUP CONTROL OF POLYOLEFINE POLYMERIZATION REACTOR

This is a Continuation of application Ser. No. 08/356,521 filed Dec. 15, 1994 now abandoned.

BACKGROUND OF THE INVENTION

1. Field of the Invention

The present invention relates to a method and an apparatus necessary for the startup control of a polyolefine polymerization reactor which produces polyolefines by repeated polymerization of olefines such as ethylene.

2. Technical Background

Generally, the concentration of olefines inside a polyolefine polymerization reactor (hereafter referred to simply as the olefine concentration) has a substantial effect on the catalytic activity.

Therefore, the control of the olefine concentration is necessary in order to prevent any unwanted reactions due to the increase in catalytic activity or decrease in the operational efficiency due to a lowered catalytic activity state. Furthermore, in the case in which olefines are polymerized with the presence of either one of or both chain transfer agents and comonomers, then the ratio between the chain transfer agent concentration and the olefine concentration and the ratio between the comonomer concentration and the olefine concentration also have a substantial effect on the physical properties of the polyolefine. That is, it is necessary to control the olefine concentration from a product quality control standpoint as well.

During steady operation in which constant operating conditions are maintained, feedback control methods, such as PID control, or control methods using models calculated from the material balance of the olefines are commonly used. However, in non-steady operation, such as during startup, since the reaction rate and the olefine concentration change non-linearly, it has been impossible to put into practice a stable and robust control of the olefine concentration.

In this case, startup refers to the process of gradually increasing the feed rate of catalysts and olefines from a state in which there are no reactions to a target state of steady operation wherein a desired rate of polymerization is taking place.

Previously, when performing the startup of a polyolefine polymerization reactor, a method was used in which a skilled operator used specifically for this task was employed to change the feed rate of catalysts and olefines and other operational rates depending on the state of the polymerization reaction based on his own experience.

However, the polymerization reaction rate is determined by the temperature of the reaction mixture, the concentration of catalysts, the catalytic activity, and the concentration of olefines. Therefore, during the startup, when the feed rate of olefines and the feed rate of catalysts is changing over time, the concentration of olefines and the reaction rate change non-linearly. Consequently, the generation of mistakes in the handling of the olefine feed rate as well as disorder in the internal activity of the polyolefine polymerization reactor due to the insufficient supervision of the olefine concentration were not uncommon.

Furthermore, if the operation of the reactor is performed slowly, so as to be able to watch over the conditions inside the polyolefine polymerization reactor, then a problem results because the time required for startup becomes extremely long.

On the other hand, automatic operation of the startup of a polyolefine polymerization reactor was problematic due to the following reasons:

(1) Because of the time wasted by the measurement of the olefine concentration, the efficiency goes down. That is, in most constant value control operations, feedback control is used in order to maintain control at a constant rate. However, in the polyolefine polymerization reactor, it is difficult to directly measure the olefine concentration. Additionally, time is required to send the contents of the polyolefine polymerization reactor, not including the generated polyolefine, to an analysis device, so delays of several minutes should be expected when the operational results for the polyolefine polymerization reactor are shown. Thus, there is a problem in that the activity of the polyolefine polymerization reactor becomes disorganized due to operational delays.

(2) As the reaction rate between the olefines and the catalysts changes moment by moment, the features of the changes are different for each startup based on minor discrepancies in the various conditions upon which the reaction depends. For this reason, the supervision of the olefine concentration by control methods using some pre-set guidelines such as program control or sequence control is not possible in practice.

(3) A method whereby the activity of the olefine concentration in the polyolefine polymerization reactor is represented by a mathematical model and controlled based on the solution of the mathematical model could be considered. However, a suitable mathematical model necessarily contains several non-linear simultaneous equations, which in general must be solved by numerical methods, since no analytical methods are known. Also, since the precise calculation of the catalyst feed rate is generally quite difficult, the errors involved often become large.

SUMMARY OF THE INVENTION

The objective of this invention is to perform the startup of a polyolefine polymerization reactor, which acts nonlinearly and for which the measurement of the respective conditional rates is difficult, in a short period of time. Another objective of this invention is automate the startup of a polyolefine polymerization reactor as described above.

In the startup control method for a polyolefine polymerization reactor of the present invention, olefines and catalysts are continually delivered to a polyolefine polymerization reactor in which the temperature and pressure are controlled. When polyolefine is to be produced, the olefine feed rate is determined by the reaction rate which is set by performing a heat balance within the polyolefine polymerization reactor, the reaction balance calculated from the amount of dynamic compensation and the unreacted amount, and the olefine concentration within the polyolefine polymerization reactor.

With the startup control method for a polyolefine polymerization reactor in the present invention, the reaction rate is set by the heat balance inside the polyolefine polymerization reactor, as a consequence, the generation of errors due to the recurrence of catalytic activity and difficulties in the measurement of the catalytic flow rate may be avoided. Also, because the reaction balance is calculated from the the reaction rate, the measurable unreacted amount, and the dynamic compensation amount for correcting non-steady states, said reaction balance is an accurate indicator of any non-steady activity within the polyolefine polymerization reactor. Therefore, based on the reaction balance and the new olefine concentration calculated in this way, the appropriate olefine feed rate can be determined, and a steady state can be reached in a short amount of time without sending the inner activity of the polyolefine polymerization reactor into disorder.

Due to this, model errors are reduced, and it is possible to improve the practicality of a feed-forward control system. Furthermore, as a result, besides reducing the time required for startup, fluctuations in the olefine concentration during startup can be kept under control, and the production efficiency of polyolefine is increased.

Additionally, the startup control apparatus for a polyolefine polymerization reactor in this invention consists of a temperature measurement means for determining the reaction heat dissipation rate within the polyolefine polymerization reactor; a means for measuring the olefine concentration within the polyolefine polymerization reactor; a memory means for storing a pre-set dynamic compensation amount; a balance calculation means for calculating the reaction rate and the unreacted amount from said reaction heat dissipation rate and said olefine concentration as well as calculating the reaction balance amount from said reaction rate, said unreacted amount, and said dynamic compensation amount; and a feed rate determination means for deciding the olefine feed rate based on said reaction balance amount and the current olefine concentration.

According to this startup control apparatus for a polyolefine polymerization reactor, the reaction heat dissipation rate within the polyolefine polymerization reactor is determined from the temperature measured by the temperature measurement means, and also, the olefine concentration is measured by the operation of the concentration measurement means, and the pre-set dynamic compensation amount is stored in the memory means. Then, due to the operation of the balance calculation means, the reaction rate is calculated from the reaction heat dissipation rate, while the unreacted amount is calculated from the olefine concentration, and the reaction balance amount is calculated from said reaction rate and the unreacted amount, and the dynamic compensation amount stored in the memory means. The reaction balance calculated in this way becomes an accurate indicator of the non-steady activity within the polyolefine polymerization reactor, and due to the feed rate calculation means, the appropriate olefine feed rate is determined based on said reaction balance amount and the measured olefine concentration. In this way, a reduction in the time required for startup and an increase in the production efficiency of polyolefine is able to be attained.

DETAILED DESCRIPTIONS OF THE PREFERRED EMBODIMENTS

The following describes the method and apparatus for the startup control of a polyolefine polymerization reactor using the present invention. It is explained with reference to the attached drawings.

Figure 1:
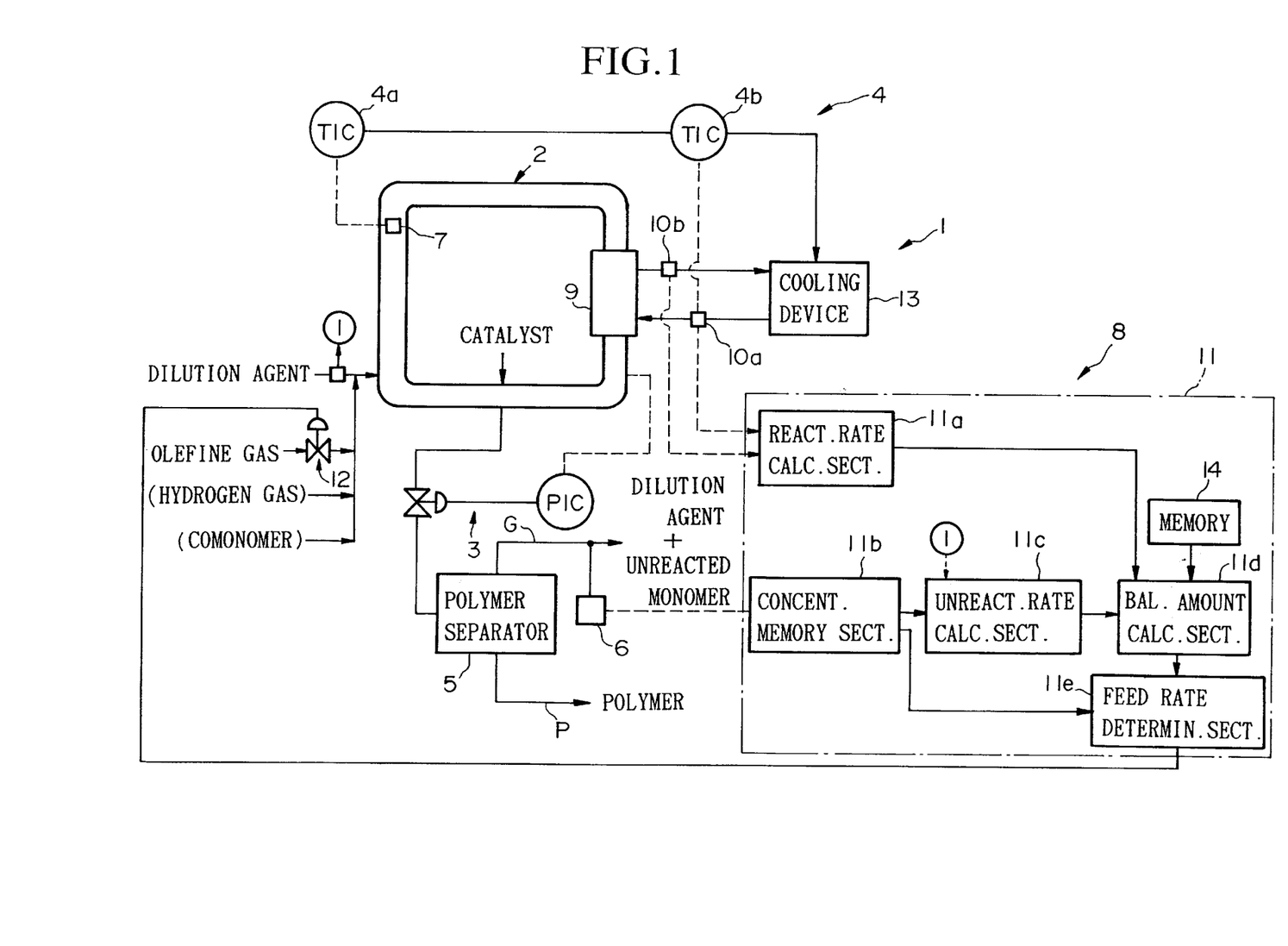
FIG. 1 is a block diagram showing an example of a polyolefine polymerization reactor making use of the startup control apparatus pertaining to the present invention.

FIG. 1 is a block diagram of the slurry phase process to produce polymers. It is an example of a polyolefine polymerization plant which uses the method and apparatus for startup control suggested by the present invention. With reference to the figure, the reference numeral 1 is a polyolefine polymerization plant, 2 is a polyolefine polymerization reactor with jacket type cooling, 3 is a pressure control loop, 4a/4b are temperature control devices, 5 is a polymer separator, 6 is an analyzer, 7/10a/10b are temperature measurement devices, 8 is a startup control apparatus, 9 is a jacket, 11 is a calculation section, 12 is an adjustment section, 13 is a cooling device, and 14 is a memory device.

This polyolefine polymerization plant 1, as shown in FIG. 1, feeds into the loop-shaped polyolefine polymerization reactor 2 the raw materials, which include olefine gas, hydrogen as a chain transfer agent as needed, and comonomers, by dissolving them into a dilution agent. Then, when the catalyst is fed into the polyolefine polymerization reactor 2, the polymerization reaction occurs within the polyolefine polymerization reactor 2, and polyolefine is made. The reaction pressure is controlled by the pressure control loop 3, and the reaction temperature is controlled by the temperature control device 4.

The contents of the polyolefine polymerization reactor 2 into the product P and the unreacted gas G in the polymer separator 5. This gas G is made up of the vaporized dilution agent and unreacted olefine. The composition of the unreacted gas G is determined by the analyzer 6.

The startup control apparatus 8 of this present invention used by the polyolefine polymerization plant 1 composed in this manner is provided within a control apparatus activated during steady operation, in addition to being run between a state of no reactions to a steady state, it is turned off when the state of steady operation is reached, and control is switched over to that of the normal control apparatus.

This startup control apparatus 8 comprises a temperature measurement device $10a/10b$ which measures the temperature at the entrance and exit of the jacket 9 through which coolant flows, the above-mentioned analyzer 6 (concentration measurement means) which measures the olefine concentration within the polyolefine polymerization reactor 2, a calculation section 11 which calculates the olefine feed rate into the polyolefine polymerization reactor 2 based on the above measurement values, and an adjustment section 12 which adjusts the olefine feed rate as per the calculations made by said calculation section 11.

The temperature measurement device 7 is attached to the temperature control device 4a, said temperature control device 4a being able to release an operation command signal MV for the temperature control device 4b so that the temperature of the polyolefine polymerization reactor 2 can be adjusted to the set value based on the measured values from the temperature measurement device 7. The temperature control device 4b, which receives the operation command signal MV, releases an operation command to the cooling device 13 which then adjusts the coolant temperature based on the measured values of the temperature measurement device 10a.

The above-mentioned calculation section 11 comprises a reaction rate calculation section 11a which calculates the reaction rate, Pr, based on the temperature difference, dT, obtained by taking the difference in the measured value between the temperature measurement devices 10a/10b on the entrance and exit of the jacket 9 of the polyolefine polymerization reactor 2; a concentration memory section 11b which continually updates and stores the latest olefine concentration value, We, inside the polyolefine polymerization reactor 2 received from the analyzer 6; an unreacted amount calculation section 11c which calculates the unreacted amount, Fs·We, (here, Fs refers to the dilution agent feed rate) based on the olefine concentration, We, stored in said concentration memory 11b; a memory 14 (memory means) for storing the value, D, to be explained; a balance amount calculation section 11d (balance amount calculation means) which calculates the reaction balance amount, X, to be explained based on the above information; a feed rate determination section 11e (feed rate determination means) which determines the olefine feed rate, Fe, based on the calculated reaction balance amount, X, and the latest olefine concentration, We, stored in said concentration memory section 11b.

The calculation section 11 composed in this way also calculates the olefine feed rate to the polyolefine polymerization reactor 2 using the control rules to be explained, and said control rules are decided by modeling the polyolefine polymerization plant 1 as follows.

First, the reaction rate, Pr, inside the polyolefine polymerization reactor 2 is represented as follows:

$$Pr = Kr \cdot V \cdot Cc \cdot We \qquad (1)$$

wherein
Kr: reaction rate constant
V: polyolefine polymerization reactor volume ($m^3$)
Cc: catalyst concentration within the polyolefine polymerization reactor ($kg/m^3$)
We: olefine concentration within the unreacted gas in the polyolefine polymerization reactor (wt %/100)

Additionally, the material balance of the olefines and catalysts within the polyolefine polymerization reactor 2 are expressed by the two equations below:

$$V \cdot \dot{C}e = Fe - (1-nh-nb) \cdot Pr - Ee \qquad (2)$$

$$V \cdot \dot{C}c = Fc - Ec \qquad (3)$$

wherein
Ce: olefine concentration within the polyolefine polymerization reactor ($kg/m^3$)
Fe: olefine feed rate (kg/h)
nh: hydrogen incorporation (wt %/100)
nb: comonomer incorporation (wt %/100)
Ee: olefine release rate (kg/h)
Fc: catalyst feed rate (kg/h)
Ec: catalyst release rate (kg/h)

Also, the rate of release of the olefines, dilution agent, and catalysts from the polyolefine polymerization reactor 2 can be expressed by equations (4) through (6) given below:

$$Ee = \frac{Es}{1 - We - Wh - Wb} \times We \qquad (4)$$

$$Es = Fs - V \cdot \dot{\rho} + V \cdot \dot{C}p + V \cdot \dot{C}e + V \cdot \dot{C}h + V \cdot \dot{C}b \qquad (5)$$

$$Ec = (Cc/Cs) \times Es \qquad (6)$$

wherein
Es: dilution agent release rate (kg/h)
Wh: hydrogen concentration within the unreacted gas in the polyolefine polymerization reactor (wt %/100)
Wb: comonomer concentration within the unreacted gas in the polyolefine polymerization reactor (wt %/100)
Fs: dilution feed rate (kg/h)
$\rho$: density within the polyolefine polymerization reactor ($kg/m^3$)
Cp: polyolefine concentration within the polyolefine polymerization reactor (wt %/100)
Ch: hydrogen concentration within the polyolefine polymerization reactor ($kg/m^3$)
Cb: comonomer concentration within the polyolefine polymerization reactor ($kg/m^3$)
Cs: dilution agent concentration within the polyolefine polymerization reactor ($kg/m^3$)

Additionally, using other related equations, it is possible to express the olefine concentration, Ce ($kg/m^3$), and the dilution agent concentration, Cs ($kg/m^3$), by the following equations (7) and (8):

$$Ce = \rho \cdot (1-Wp) \cdot We \qquad (7)$$

$$Cs = \rho \cdot (1-Wp) \cdot (1-We-Wh-Wb) \qquad (8)$$

wherein
Wp: polyolefine concentration within the polyolefine polymerization reactor (wt %/100)

Then, the following approximations are made.
That is,
in equation (2), nb≈0, nh≈0
in equations (4) and (8), 1−We−Wh−Wb≈1
in equation (5), Es≈Fs
in equation (7) and (8), $\rho \cdot (1-Wp)$≈constant Following the above assumption, equations (2) and (3) become:

$$V \cdot \rho \cdot (1-Wp) \cdot \dot{W}e = Fe - Kr \cdot V \cdot Cc \cdot We - Fs \cdot We \qquad (9)$$

wherein
Kr·V·Cc·We=Pr $$V \cdot \dot{C}c = Fc - \frac{Cc}{\rho \cdot (1-Wp)} \cdot Fs \qquad (10)$$

In this way, it is possible to determine the activity of the olefine concentration, We, by solving these equations (9) and (10). However, the reaction rate constant, Kr, of equation (9) is uncertain, which is probably due to erratic catalyst activity or poisons in the dilution agent material. Also, the accurate measurement of the catalyst flow rate, Fc, in equation (10) is difficult. As a result, some of the terms shown on the righthand side of equation (1) often have large errors. Also, because a large portion of the olefine feed amount, Fe, becomes the reaction amount, Pr, by the material balance during the steady state, it is necessary to accurately calculate this reaction rate, Pr.

For this reason, this reaction rate, Pr, is based on the heat balance. The heat balance of the polyolefine polymerization reactor 2 can be expressed by the following equation (11):

$$\dot{Q} = Pr \cdot he - C \cdot F \cdot dT \qquad (11)$$

wherein
Q: reactor heat capacity (kcal)
he: olefine polymerization energy (kcal/kg)
C: specific heat of coolant fluid (kcal/kg/°C.)

F: coolant flow rate (kg/h)

dT: temperature difference of coolant at entrance and exit of jacket (°C.)

As a result, if the reaction rate, Pr, is determined from the above equation (11), it becomes like the next equation (12), and if this is applied to the above equation (9), then the reaction balance equation of equation (13) is composed.

$$Pr = K \cdot dT + D \tag{12}$$

$$V \cdot \rho \cdot (1-Wp) \cdot We = (Fe - K \cdot dT \cdot Fs \cdot We) - D \tag{13}$$

wherein $$K = \frac{C \cdot F}{he}$$

$$D = \dot{Q}/he$$

Let us refer to the righthand side of the above reaction balance equation (13) as the reaction balance amount, X. In this way, the reaction balance amount, X, does not include the reaction rate constant or the catalyst flow rate as mentioned above, instead, it uses the coolant temperature difference, dT, between the entrance and exit of the jacket 9 which is measurable, and therefore errors are reduced. Furthermore, since it includes the values, D, (dynamic compensation amount) as a dynamic compensation term expressing the changes in heat capacity within the polyolefine polymerization reactor 2, it becomes an accurate indicator of the non-steady activity within the polyolefine polymerization reactor 2 during startup.

In this case, the change in the heat capacity within the polyolefine polymerization reactor 2 cannot be directly measured, so an approximation is made by using the values, D, based on past data. In the steady state, the value of D is zero, but during startup the amount changes moment by moment. Therefore, the value, D, is defined as a constant which gradually changes according to the tendencies. As a result, this value, D, not only compensates for the changes in heat capacity within the polyolefine polymerization reactor 2, but also decreases other model errors and noise.

The value, D, defined in this way is stored in the memory 14 (memory means) in the calculation section 11.

Based on a process model of this form, in the control procedure, the following rules are utilized.

That is, first, considering the generation of wasted time in the measurement of the olefine concentration output from the polyolefine polymerization reactor 2, a feed-forward control method is employed in which the olefine is fed without waiting for the output. In this case, as a parameter to decide the olefine feed rate, Fe, the above-mentioned reaction balance amount, X, and the latest olefine concentration, We, are used.

Second, directly after the commencement of catalyst feeding, the sensitivity of dT is not good due to the small amount reacting, so control rules are used in order to correct for this.

Third, in order to reach the target olefine feed rate, Fe, as fast as possible, if the deviation from the target feed rate is large, then a control rule is employed in which the olefine feeding is continued even if the reaction balance amount, X, and the olefine concentration reach the equilibrium point.

Fourth, a control rule is employed to ensure convergence in the neighborhood of the target olefine concentration.

Also, in order to simply and accurately carry out the above control rules, fuzzy control is employed.

Figure 2:
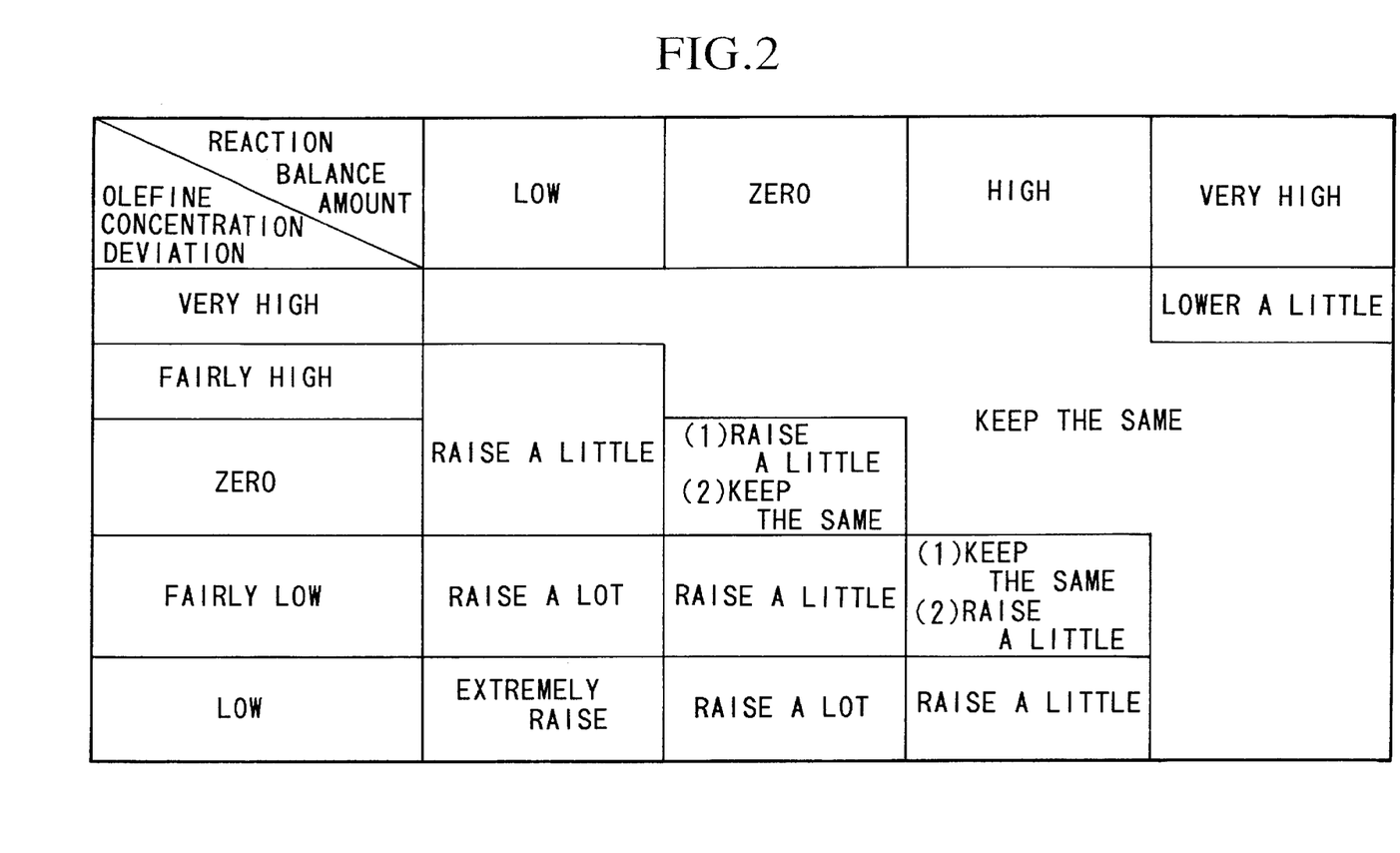
FIG. 2 is a chart showing the feed-forward rules according to the startup control apparatus of FIG. 1.
Figure 3:
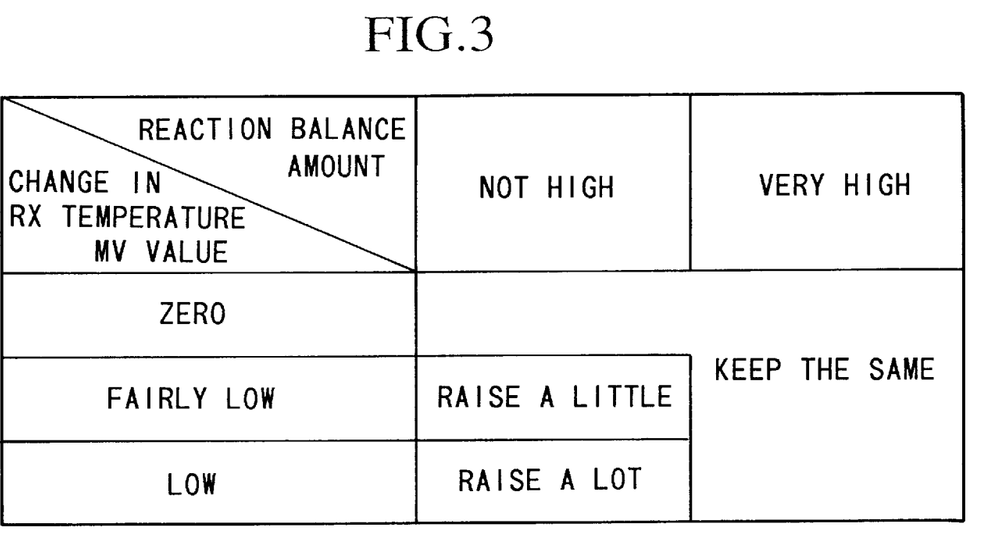
FIG. 3 is a chart showing the second control rules according to the startup control apparatus of FIG. 1.

Specifically, fuzzy rules such as the ones described in FIGS. 2 and 3 are employed. FIG. 2 shows the feed-forward rules, while FIG. 3 shows the fuzzy rules which compensate for the activity within the polyolefine polymerization reactor 2 right after the commencement of catalyst feeding as explained above as the second control rule.

In said feed-forward rules, if the deviation in the olefine concentration, We, is small and the reaction balance amount, X, is low, that is, if the present olefine concentration, We, is low compared with the target concentration and the olefine feed rate is small, then the feed rate, Fe, is increased, and in the reverse case, the feed rate, Fe, is maintained at the same value. Overall, by shifting so as to increase the number of orders to increase the olefine feed rate, Fe, the olefine feed rate is changed anticipating the changes in the parameters.

Also regarding FIG. 2, where two commands are written into the same box, the rule to speed up the arrival at the target feed rate according to the olefine flow rate given above in the third control rule and the rule to insure convergence in the neighborhood of the target olefine concentration as shown above in the fourth control rule are both included.

Additionally, as shown in FIG. 3, in the second control rule, when the olefine flow rate is lower than a set value, the olefine feed rate, Fe, is changed by using as its parameters changes in the operation order signal (RX temperature MV value) of the temperature control device 4a which is a signal detecting the start of a polymerization reaction within the polyolefine polymerization reactor 2 right after the commencement of catalyst feeding.

Furthermore, based on these fuzzy rules, by determining the maximum composition of the respective membership functions and using fuzzy logic based on a general logic method for calculating the center of gravity, it is possible to decide the most appropriate olefine feed rate, Fe, using all of the above control rules.

In a startup control device 8 for a polyolefine polymerization reactor 2 composed in this manner, the coolant temperature measured at both ends of the jacket 9 by the temperature measurement devices 10a/10b and the unreacted olefine concentration, We, measured by the analyzer 6 are entered into the calculation section 11 of the startup control device 8. Additionally, according to the temperature difference, dT, of the coolant, the reaction amount, Pr, is set by the reaction amount calculation section 11a, the unreacted amount, Fs·We, is calculated from the latest olefine concentration, We, stored in the concentration memory section 11b, and by the proper reading of the value, D, stored in memory 14, the reaction balance amount, X, is calculated by the balance amount calculation section 11d. Then, using said reaction balance amount, X, and the latest olefine concentration, We, as parameters, fuzzy logic is applied to the feed rate determination section 11e, and the olefine feed rate, Fe, is decided.

That is, in the present invention, in addition to being able to use feed-forward control because of the reduction in model errors due to the setting of the reaction rate, Pr, by the coolant temperature difference, dT, it is also possible to carry out efficient control based on the proper olefine feed rate, Fe, because the olefine feed rate, Fe, is determined using the reaction balance amount, X, and the latest olefine concentration, We, which accurately represent the activity within the polyolefine polymerization reactor 2, as the parameters. Furthermore, the determination of the olefine feed rate, Fe, is made by fuzzy logic, so rules based on the experience of trained operators and many other control conditions may be built in as well.

Also, in the startup control method of the polyolefine polymerization reactor 2 of this invention, the olefine feed rate is adjusted based on operation order signals from the temperature control, so the responsiveness of the reaction balance amount, X, at startup is preserved due to the setting of the reaction amount based on the heat balance within the polyolefine polymerization reactor 2, so the commencement of a reaction is able to be quickly detected and the materials are able to be fed.

Furthermore, in the startup control method of the polyolefine polymerization reactor 2 of the present invention, the olefine feed rate, Fe, is adjusted based on changes in the reaction balance amount, X, in the neighborhood of the target olefine concentration. Because of this, the behavior of the changes in the output olefine concentration is stabilized in the neighborhood of the target olefine concentration. Therefore, rapid fluctuations in the olefine concentration are prevented, and the activity inside the polyolefine polymerization reactor 2 is made stable.

Additionally, in the startup control method of the polyolefine polymerization reactor 2 of the present invention, the olefine feed rate, Fe, is adjusted based on the deviation from the target olefine feed rate. Due to this, in a state in which the desired steady state polymerization reaction conditions are not satisfied within the polyolefine polymerization reactor 2, even if the olefine concentration is at the target value, the feeding of olefine continues, and the startup procedure does not stop. Thus, the time required for reaching the target olefine feed rate is shortened.

Then, according to the method and apparatus for control of the startup of a polyolefine polymerization reactor of the present invention, the startup features are improved and the time required to reach the steady state is reduced.

Also, the method and apparatus for the startup control of a polyolefine polymerization reactor 2 according to the present invention may be used with a low or middle pressure polymerization reactor. An example of the present invention was explained for use with the loop type slurry phase method, but it may also be applied to a vessel type slurry phase method or a gas phase method as well. Therefore, only the determination of the material balance equations (2) and (3) describing the activity of the olefine concentration within the polyolefine polymerization reactor 2 is required.

As a cooling method, a jacket type cooling system was explained, but a method in which cooling pipes are installed within the polyolefine polymerization reactor 2, a method using a heat transfer device installed outside of the polyolefine polymerization reactor, a method using the vaporization heat of the olefine or dilution agent, or a system combining these methods may also be used. That is, it is satisfactory so long as the amount of heat lost is determined from the heat balance and material balance. The type of method used does not matter.

Furthermore, in the case in which dilution agent is used in the polyolefine polymerization reactor 2, the type of dilution agent is not limited either. That is, besides such inactive organic compounds as butane, pentane, and hexane, it is also possible to use such inert gases as nitrogen with a gas phase polymerization reactor. There are also no particular limits on the type of catalyst to be used, and it is possible to use various types of catalysts such as Ziegler or Phillips catalysts.

In this way, the method and apparatus for the startup control of a polyolefine polymerization reactor 2 of the present invention does not have any special limits on the cooling method or the catalyst used, but a slurry phase method polymerization reactor 2 in which the olefine concentration within the polyolefine polymerization reactor 2 is extremely low is most effective.

As the basic control rules, a feed-forward control system was used, but in addition to this, a feedback control system for eliminating deviations due to outside disturbances and other such control rules are also possible.

As shown in FIG. 1, a specific example of the present invention in which a loop type reactor of volume 40 m$^3$ with a jacket type cooling method is used with isobutane as the dilution agent and polyethylene as the polyolefine is explained below.

Figure 4:
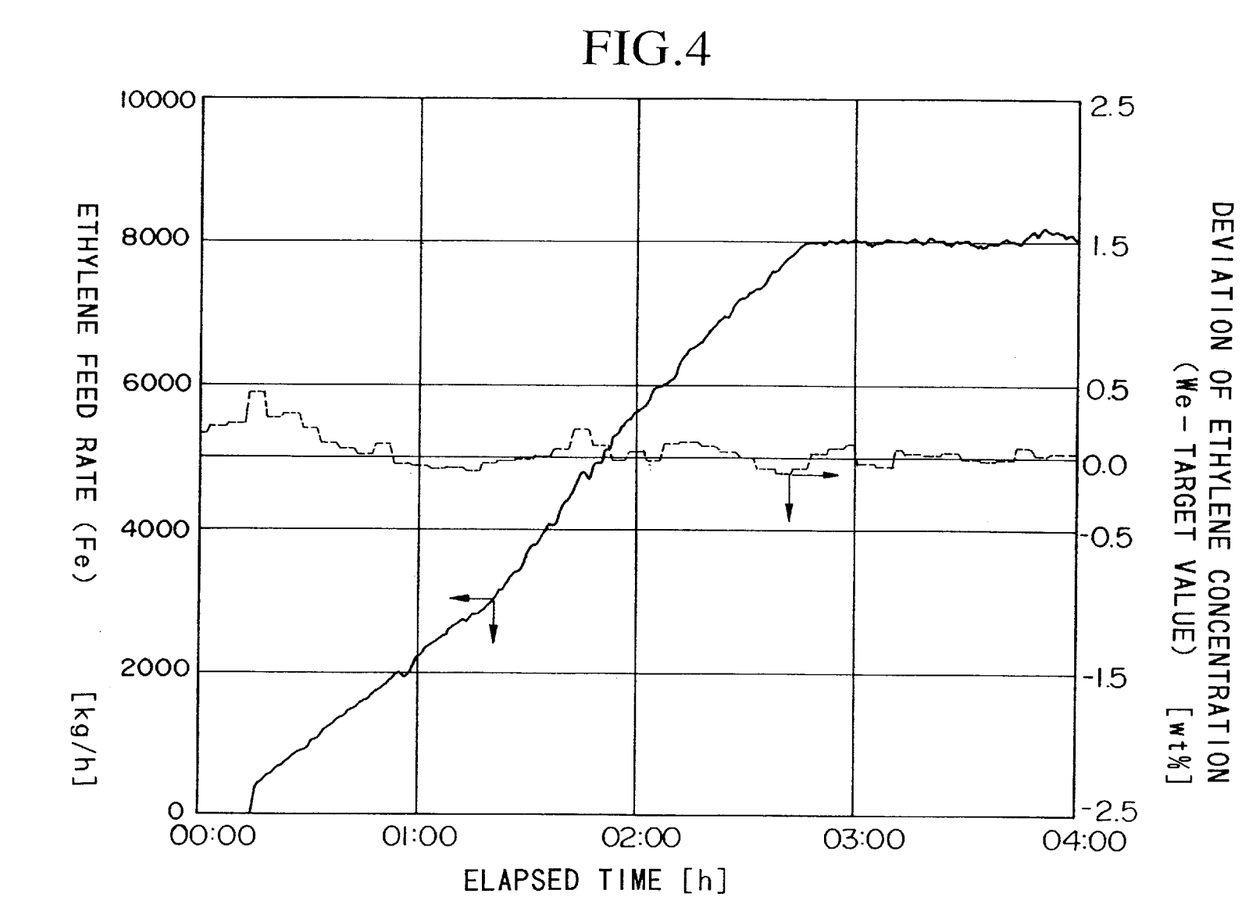
FIG. 4 is a graph showing the startup characteristics due to the startup control apparatus of FIG. 1.

The activity of the ethylene concentration, We, and the ethylene feed rate, Fe, upon startup of the polyolefine polymerization reactor 2 of the startup control apparatus 8 is as shown in FIG. 4.

The results are measured under a reactor pressure of 42.5 kg/cm$^2$ and a reactor temperature of 101.0° C. Generally, it is possible to achieve similar results with a reactor pressure of 5–50 kg/cm$^2$ and a reactor temperature of 50°–120° C.

Figure 5:
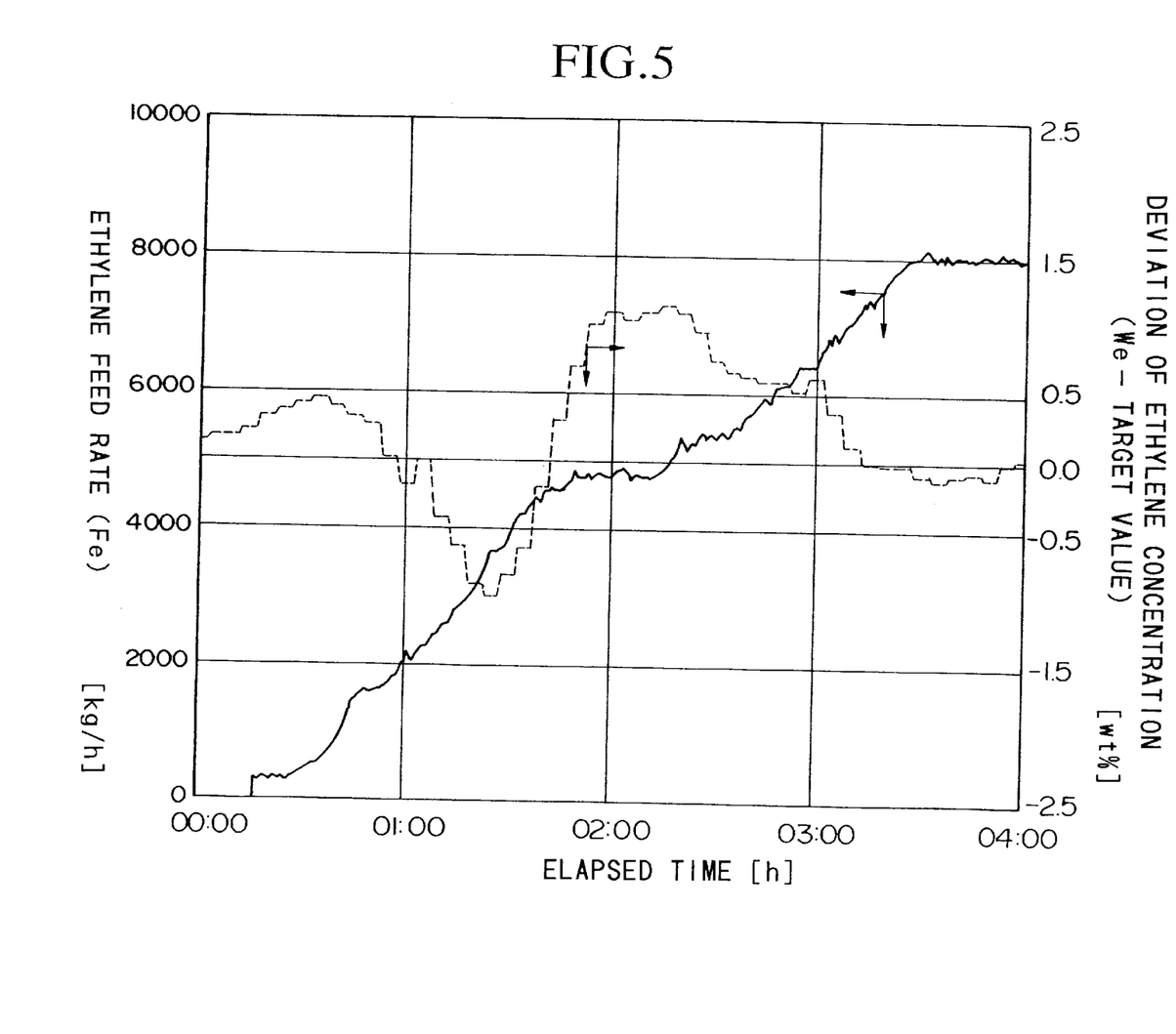
FIG. 5 is a graph showing the startup characteristics due to a startup operation of the past.

FIG. 5 shows the results due to manual operation by an experienced operator in the past.

Making a comparison, with the startup control apparatus 8 of the present embodiment, changes in the ethylene feed rate, Fe, from startup to the steady state are smooth, and there are no ups and downs as there are in the case of manual operation. From this, it may be reasoned that the feeding of ethylene is being performed properly and without waste, and as a result, the time required from startup to the steady state is shortened. Also, fluctuations in the unreacted concentration of ethylene, We, within the polyolefine polymerization reactor 2 during startup are reduced, and catalystic activity during the reaction is held in a stable condition.

What is claimed is:

1. A startup control method for a polyolefin polymerization reactor during non-steady-state startup, the method comprising the steps of:
    (a) calculating:
        (1) a reaction rate within said reactor from a heat balance within said reactor and a dynamic compensation amount defined as an olefin feed rate function based on past heat capacity variation behavior;
        (2) an unreacted amount from a current olefin concentration within said reactor;
        (3) a reaction balance amount representing a time variation of the olefin concentration within said reactor from said reaction rate, said unreacted amount and said olefin feed rate;
    (b) calculating a deviation between a target olefine concentration and said current olefin concentration;
    (c) determining a startup olefine feed rate based on said reaction balance amount and said deviation of the olefin concentration; and
    (d) delivering olefines to said reactor according to said startup olefine feed rate.

2. A method for startup control of a polyolefin polymerization reactor according to claim 1, wherein said olefin feed rate is decided by the application of fuzzy logic based on the reaction balance amount and the olefin concentration.

3. A method for startup control of a polyolefin polymerization reactor according to claim 1 or 2, wherein said olefin feed rate is adjusted based on an operation command signal from temperature control.

4. A method for startup control of a polyolefin polymerization reactor according to claim 1, wherein said olefin feed rate is adjusted based on the deviation from the target olefin feed rate.

5. A method for startup control of a polyolefin polymerization reactor according to claim 2, wherein said olefin feed rate is adjusted based on the deviation from the target olefin feed rate.

6. A method for startup control of a polyolefin polymerization reactor according to claim 3, wherein
said olefin feed rate is adjusted based on the deviation from the target olefin feed rate.

7. A method for startup control of a polyolefin polymerization reactor according to claim 4, wherein
said olefin feed rate is adjusted based on the deviation from the target olefin feed rate.

8. A method for startup control of a polyolefin polymerization reactor according to claim 5, wherein
said olefin feed rate is adjusted based on the deviation from the target olefin feed rate.

9. A method for startup control of a polyolefin polymerization reactor according to claim 6, wherein
said olefin feed rate is adjusted based on the deviation from the target olefin feed rate.

10. A startup control method for a polyolefin polymerization reactor according to claim 1, further comprising determining said olefin feed rate by reducing an incrementation of said olefine feed rate in response to an increase in the reaction balance amount or the olefin concentration deviation.

* * * * *